United States Patent
Healy (10) Patent No.: US 11,686,417 B2
(45) Date of Patent: Jun. 27, 2023

(54) APPARATUS FOR AUTONOMOUS PIPELINE ASSESSMENT

(71) Applicant: Timothy Healy, Indianapolis, IN (US)

(72) Inventor: Timothy Healy, Indianapolis, IN (US)

(*) Notice: Subject to any disclaimer, the term of this patent is extended or adjusted under 35 U.S.C. 154(b) by 632 days.

(21) Appl. No.: 16/571,149

(22) Filed: Sep. 15, 2019

(65) Prior Publication Data
US 2020/0088340 A1    Mar. 19, 2020

Related U.S. Application Data

(60) Provisional application No. 62/731,996, filed on Sep. 17, 2018.

(51) Int. Cl.
*F16L 55/38*       (2006.01)
*F16L 55/46*       (2006.01)
*F16L 101/30*      (2006.01)

(52) U.S. Cl.
CPC .............. *F16L 55/38* (2013.01); *F16L 55/46* (2013.01); *F16L 2101/30* (2013.01)

(58) Field of Classification Search
CPC ........... F16L 55/38; F16L 55/26; F16L 55/28
See application file for complete search history.

(56) References Cited

U.S. PATENT DOCUMENTS

| | | | | |
|---|---|---|---|---|
| 4,870,773 A * | 10/1989 | Schmucker | ............ | A01K 77/00 43/12 |
| 8,024,066 B2 * | 9/2011 | Reverte | ................. | G01S 13/881 385/103 |
| 10,769,684 B1 * | 9/2020 | Kushner | ................. | F01D 15/00 |
| 2003/0121338 A1 * | 7/2003 | Yates | ....................... | F16L 55/38 73/53.01 |
| 2005/0115337 A1 * | 6/2005 | Tarumi | .................... | F16L 55/32 73/865.8 |
| 2008/0204008 A1 * | 8/2008 | Paulson | ................ | G01M 3/005 324/220 |
| 2014/0009598 A1 * | 1/2014 | O'Donnell | ............. | G03B 37/04 348/84 |
| 2014/0157650 A1 * | 6/2014 | Blood | ....................... | A45B 3/00 135/66 |
| 2016/0069821 A1 * | 3/2016 | Taferner | .................. | F16L 55/48 356/241.1 |

(Continued)

FOREIGN PATENT DOCUMENTS

| | | | | |
|---|---|---|---|---|
| KR | 1020110091956 A | * | 8/2011 | ............... H04N 7/18 |
| KR | 1020110091957 A | * | 8/2011 | ............ G01M 99/00 |
| WO | WO-2012165825 A2 | * | 12/2012 | ................. E03F 7/12 |

OTHER PUBLICATIONS

Acepipecleaning; FlyEye HD Profiler; youtube.com video; https://www.youtube.com/watch?v=r9j7tf6DvEs; accessed Apr. 18, 2022; published Aug. 3, 2010. (Year: 2022).*

(Continued)

*Primary Examiner* — Daniel J Colilla
(74) *Attorney, Agent, or Firm* — Bradshaw Law LLC (57) ABSTRACT

A method is provided for the autonomous assessment of pipelines. The apparatus combines commercially available mechanisms for pipeline assessment in a unique untethered pipeline assessment device that is propelled through the pipeline by the flow of liquid in the pipeline, thus allowing for the assessment of pipelines much cheaper, faster, safer and less disruptive to the community than the current assessment methods.

19 Claims, 8 Drawing Sheets

(56) References Cited

U.S. PATENT DOCUMENTS

| | | | | |
|---|---|---|---|---|
| 2017/0219157 A1* | 8/2017 | Ethirajan | ................ | H04W 4/70 |
| 2018/0177064 A1* | 6/2018 | van Pol | ................ | G01D 11/245 |
| 2018/0283978 A1* | 10/2018 | Ramirez Garcia | ... | G01M 3/005 |
| 2019/0339210 A1* | 11/2019 | Stewart | ................... | G06T 11/00 |

OTHER PUBLICATIONS

RedZoneRobotics1; RedZone's Solo Sewer Inspection Robot Makes KTUU News in Alaska; youtube.com video; https://www.youtube.com/watch?v=a7EGOoMmt7k; accessed Apr. 19, 2022; published Oct. 5, 2011. (Year: 2011).*

* cited by examiner

APPARATUS FOR AUTONOMOUS PIPELINE ASSESSMENT

CROSS-REFERENCE TO RELATED APPLICATIONS

This non provisional utility patent claims the benefit of a provisional application. The provisional patent has Application No. 62/731,996 with Filing or 371(c) Date of Sep. 17, 2018

STATEMENT REGARDING FEDERALLY SPONSORED RESEARCH OR DEVELOPMENT (IF APPLICABLE)

Not Applicable

REFERENCE TO SEQUENCE LISTING, A TABLE, OR A COMPUTER PROGRAM LISTING COMPACT DISC APPENDIX (IF APPLICABLE)

Not Applicable

BACKGROUND OF THE INVENTION

The present invention relates to a system and technique for assessing pipelines, such as storm and wastewater sewers. More particularly, though not exclusively, the invention relates to an autonomous assessment apparatus that is untethered and propelled by fluid flow through the pipeline and thus capable of providing rapid multiple parameter (location, visual inspection (camera with lighting), scans above the liquid surface (laser), scans below the liquid surface (sonar), velocity, temperature, turbulence, pipeline liquid quality, gases in pipeline headspace, etc.) assessment through numerous pipeline segments.

Infrastructure in the United States is in significant need of renewal. The United States Environmental Protection Agency (US EPA) estimates that $51 billion dollars is required over the next 20 years to rehabilitate the nations existing sewer systems (Environmental Protection Agency, Clean Water Needs Survey, 2012 Report to Congress, December 2016). The American Society of Civil Engineers in their 2017 Infrastructure Report Card has issued a grade of "D+" for the condition of the nation's wastewater infrastructure.

Many utilities are already spending to their limit of affordability. The high cost associated with the current methods of assessing and rehabilitating sewer pipelines prohibits all of the needed work from being performed. When the preventative work of sewer pipeline assessment and rehabilitation is not performed and the sewer pipeline ultimately collapses, the cost to rehabilitate the sewer pipeline increases exponentially. This delayed pipeline maintenance and the sewer pipelines ultimate failure causes economic disruptions to utilities and physical disruptions to the community. New and more efficient tools and technology will be required to renew and sustain this critical infrastructure into the future.

The current method of pipeline assessment most commonly used is a Closed Circuit Televised (CCTV) assessment. The CCTV assessment method involves sending a camera attached to a remote-controlled vehicle into the pipeline. The crew performing the CCTV assessment controls the vehicle from above grade via direct tethered connection to the vehicle. The crew drives the vehicle the length of the pipeline to capture images of defects or maintenance issues in the pipeline. These images can then be rated and given a numeric value to prioritize which pipeline segments are in most urgent need of rehabilitation, allowing utilities to target limited resources to their most urgent needs.

The CCTV method of assessment is widely used and produces valuable information to allow utilities to make smart investments in infrastructure rehabilitation, however there are a number of detriments that if improved upon could aid all utilities. To better understand these detriments, a detailed description of the steps involved in performing a CCTV inspection are outlined below: To perform the CCTV assessment, a two-person crew drives to the area and must park within a few feet of the upstream or downstream manhole. This is relatively straight forward if the pipeline is in the center of a residential street with light traffic. It is much more complex if the pipeline is in a heavily wooded area, a sensitive area (i.e. public park, wetland, etc.) or in a roadway that requires significant maintenance of traffic planning or police assistance to provide safe access to the pipeline. To perform the CCTV assessment, the crew sets up traffic control materials, removes the manhole lid, lowers the camera vehicle into the pipeline and drives the vehicle through the pipeline collecting images used in the pipeline assessment. The crew then drives the camera vehicle back through the same pipeline, pulls the camera vehicle up and out of the pipeline at the manhole, replaces the manhole lid, collects or moves the traffic control materials and then drives to the next manhole along the pipeline. Once there, the process repeats itself: set up the traffic control materials, remove the manhole lid, lower the camera vehicle into the pipeline, drive back and forth through the pipeline collecting information, remove the camera vehicle, collect or move the traffic control materials and drive to the next manhole along the pipeline.

Cost is the first detriment. The current method of pipeline assessment is cost prohibitive and results in utilities not knowing the condition of their infrastructure and properly evaluating their potential risks. Non-emergency or preventative maintenance activities are often postponed or deferred due to cost. Yet, every year, multiple cities in the United States experience catastrophic sewer pipeline failures. The collapse of a 50 to 100-year-old sewer pipeline can cause a large sinkhole that endangers human life and results in the disruption of life in the community as roads are closed, homes damaged or destroyed and the fiscal health of a utility damaged by the unplanned cost of an emergency repair.

Time is the second detriment. The current assessment method requires a significant amount of time both to conduct the assessment and analyze the data gathered during the assessment.

Safety is the third detriment. To perform the CCTV assessment, the crew is typically in the center of an active road with traffic moving along both sides of the CCTV truck. With traffic moving in close proximity to the crew and the CCTV truck, there is a risk that either a distracted driver could hit the crew or the CCTV truck, or that the crew could slip, trip or otherwise fall into traffic.

Community disruption is the fourth detriment. With much of this work being performed in roadways, it is inevitable that the CCTV assessment will require detours, traffic restrictions, lane closures, potential police assistance, etc. This may result in traffic congestion, delays and a general loss in productivity for the community.

Note that while there are other methods being used for pipeline assessment, CCTV is still the most prevalent. Alternately, an acoustic assessment method allows for rapid assessment of pipelines, but only detects blockages in pipelines and does not provide a visual inspection which is needed to perform a structural assessment of the pipeline.

Use of this autonomous pipeline assessment apparatus would significantly reduce both the cost and time required to perform pipeline assessment, while also significantly reducing the safety risks to workers conducting the assessment and disruptions to the community at large. By performing pipeline assessments cheaper, faster, safer and less disruptive, many more pipelines could be assessed and pipeline defects that would have resulted in collapses and expensive point repairs could be addressed for significantly less cost as a rehabilitation project. This apparatus will allow utilities to become more proactive and efficiently and effectively target their limited pipeline rehabilitation budgets.

Prior art established the mechanisms for the assessment (cameras, sonar, etc.) methodology.

BRIEF SUMMARY OF THE INVENTION

The present invention provides a means for rapid autonomous assessment of pipelines. While the actual nature of the invention covered herein can only be determined with reference to the claims appended hereto, certain aspects of the invention that are characteristic of the embodiments disclosed herein are described briefly as follows.

The apparatus combines existing mechanisms for multiple parameter assessment (location, visual inspection (camera with lighting), scans above the liquid surface (laser), scans below the liquid surface (sonar), velocity, temperature, turbulence, pipeline liquid quality, gases in pipeline headspace, etc.) within a unique pipeline assessment device. The existing mechanisms for multiple parameter assessment are commercially available and the apparatus would be compatible with the existing mechanisms. The apparatus would provide the same level of visual pipeline assessment as is currently achieved, but without the added cost, time, safety risks and community disruptions, etc. associated with the current assessment method. The apparatus may also provide an enhanced level of assessment by documenting velocity, temperature, turbulence, pipeline liquid quality, gases in pipeline headspace, etc. that can be indicative of pipeline deterioration but are not typically gathered during a CCTV assessment.

The apparatus would greatly reduce the cost and time associated with gathering the assessment information. The apparatus will be lowered into the pipeline and move autonomously through the pipeline, gathering information on multiple pipeline segments and negate the need for the crew to drive from manhole to manhole, setting up traffic control, launching and retrieving the CCTV robot over and over again. The assessment with the apparatus will improve labor productivity and accelerate the data collection process. The assessment with the apparatus is also safer and less disruptive to the community because performing an assessment with the apparatus requires a crew to access only two manholes, one manhole to insert the apparatus in the pipeline and one manhole to retrieve the apparatus from the pipeline. Depending on the size of the pipeline system, a traditional CCTV assessment could require the same crew to access multiple manholes. The shear reduction in the number of times a crew will be working in the center of a roadway, or other precarious situations, will reduce the risk of an accident occurring and making the assessment work that much safer. Similarly, by having fewer detours, traffic restrictions, lane closures, and potential police assistance, performing the assessment with the apparatus will greatly reduce the overall community disruption compared to an assessment via traditional CCTV.

The apparatus consists of two main components. The lower component allows for the autonomous inspection of the pipeline. It may include guide vanes that will submerge when the apparatus is placed in a pipeline and will assist in stabilizing the movement of the apparatus through the pipeline. This lower component also includes an adjustable buoyancy/counter weight that allows the apparatus to maintain the appropriate level of submergence as well as a center of gravity. This lower component may also include mechanisms for assessment, i.e. pipeline liquid quality, sonar, etc. The lower and upper components are connected via a number of exterior clamps that compress gaskets to generate a water tight seal. The upper component contains the mechanisms for assessment, i.e. camera(s), laser, global positioning system, gas monitor, etc. The upper component may contain single or multiple mechanisms. Some mechanisms are contained within the upper component while others are partially within the upper component but have some portion of the mechanism on the outside of the upper component. Mechanisms for assessment could also be located on the outside of either the upper or lower component.

The apparatus would also allow for the rapid collection of data that is very difficult, dangerous and time consuming to gather. Currently, if a utility wants to understand the location and concentration of corrosive gases (hydrogen sulfide, etc.) or if oxygen is present in the sewer pipeline headspace, a series of monitoring sensors would need to be temporarily installed at a number of manholes throughout the sewer pipeline collection system. This method is time consuming, expensive and only provides information at the locations monitored. The apparatus can be equipped with gas monitoring equipment and be continuously monitoring as the apparatus moves through the collection system generating a profile of oxygen, hydrogen sulfide, etc. concentrations. When this information is then combined with information on the temperature and turbulence of the liquid in the pipeline (factors indicative of hydrogen sulfide generation) utilities can target their limited resources to the locations most in need of rehabilitation. They can become more predictive and begin to transition from replacing and rehabilitating failing pipelines to performing maintenance, etc. to prevent the pipeline from corroding. The same benefit would apply to odor generating compounds or the pH level of the liquids.

Depending on the complexity and size of the pipeline, multiple apparatuses could be deployed. In a municipal sewer pipeline collection system, an apparatus could be deployed in each of the major trunks, which all combine into a single interceptor that flows to a large pump station or treatment facility. Using this apparatus, the sewer pipeline assessment information could be gathered by a two-person crew in approximately one to two days. Using the CCTV method, it could take a two-person crew up to a year to complete the entire assessment.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWING

Although the characteristic features of this invention will be particularly pointed out in the claims, the invention itself, and the manner in which it may be made and used, may be better understood by referring to the following description taken in connection with the accompanying figures forming a part thereof.

DETAILED DESCRIPTION OF THE INVENTION

For the purposes of promoting an understanding of the principles of the invention, reference will now be made to the embodiments illustrated in the drawings, specific language will be used to describe the same. It will nevertheless be understood that no limitation of the scope of the invention is hereby intended. Alterations and further modifications in the illustrated pipeline assessment device or devices, and such further applications of the principles of the invention as illustrated herein are contemplated as would normally occur to one skilled in the art to which the invention relates.

In one form, the present invention provides a system and method for rapid autonomous assessment of pipelines. The present invention provides for a unique combination of existing commercially available mechanisms for pipeline assessment within a pipeline assessment device which increases the cost effectiveness, speed and safety at which condition assessments are performed as well as decreasing the traffic congestion and general disruption to the community.

Figure 1:
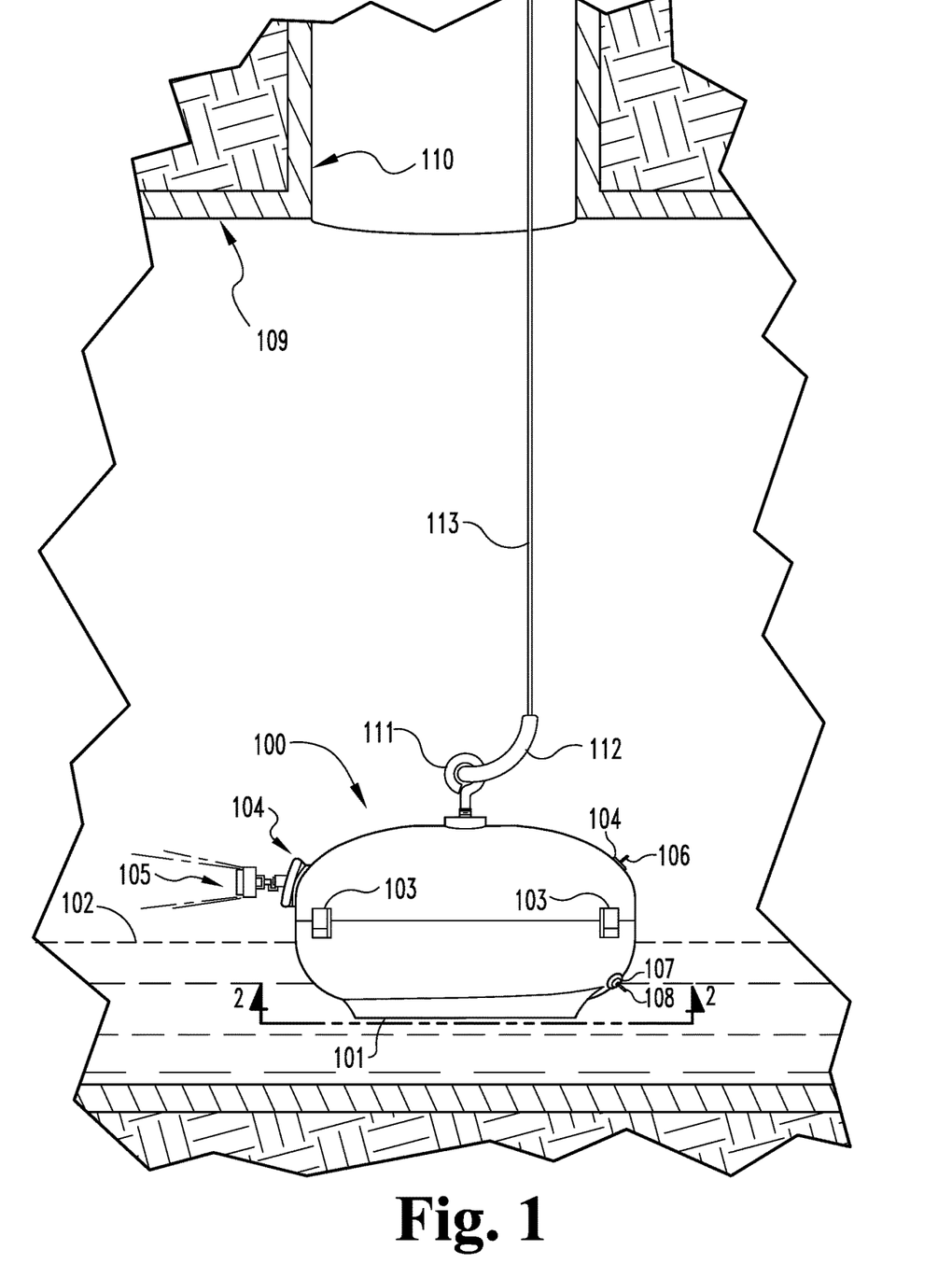
FIG. 1 is a general schematic drawing showing the apparatus performing a condition assessment of a pipeline to the embodiment. Illustrated are the pipeline assessment device, guide vanes, and multiple mechanisms for assessment as would be utilized during a pipeline assessment.
Figure 6:
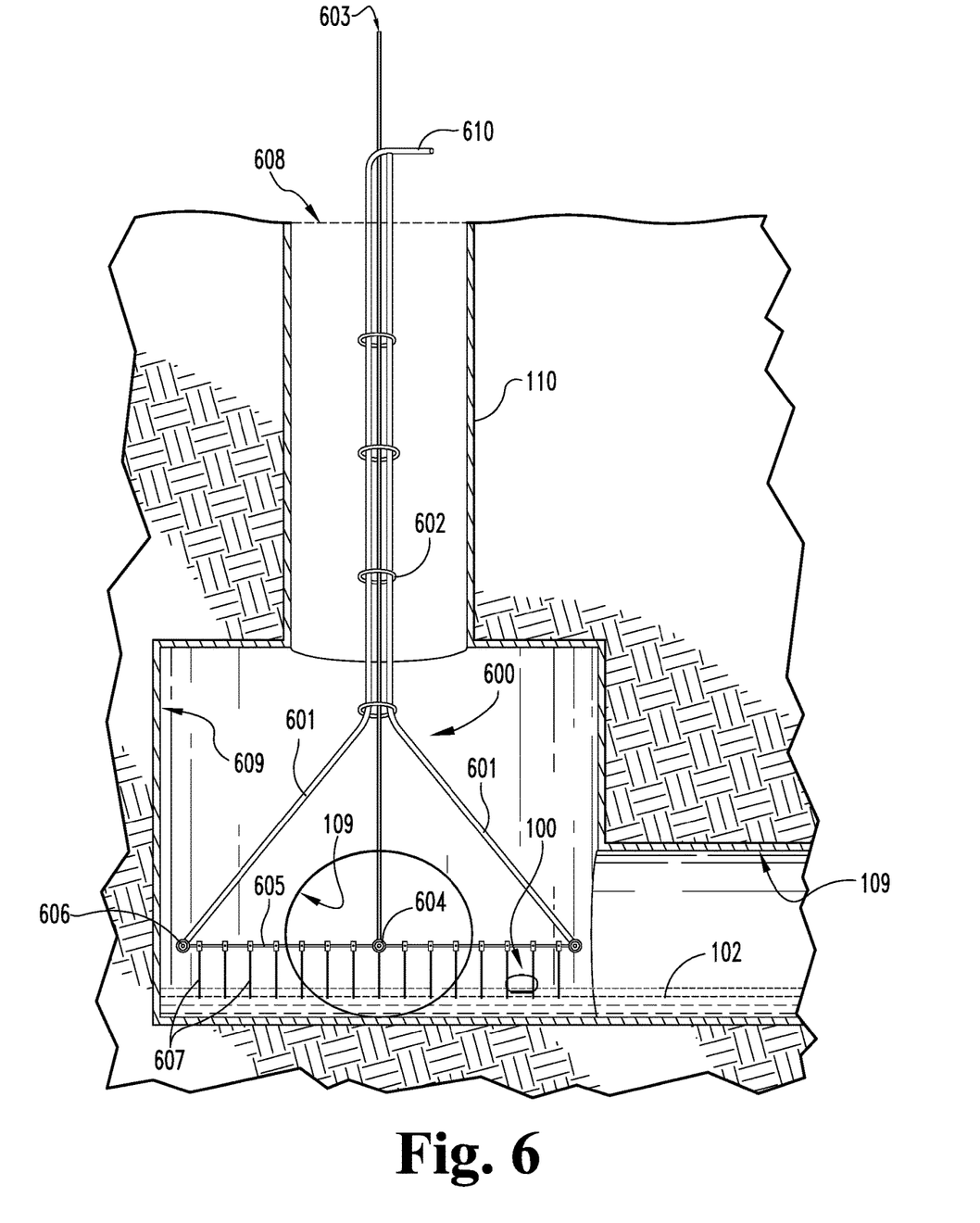
FIG. 6 is a general schematic drawing of the tool used to remove the apparatus from the pipeline shown in FIG. 1. Illustrated is the removal rake.

FIG. 1 provides a general schematic drawing of the apparatus. Illustrated is the pipeline assessment device 100 with the guide vanes 101, as the apparatus would be moving with the pipeline liquid flow 102 through the pipeline 109. Using the pipeline liquid flow 102 to move the apparatus through the pipeline 109 without the need for a tethered connection and human controller facilitates the benefits associated with the pipeline assessment device 100 (increased speed of assessment, decreased cost for assessment, decreased community disruption and decreased risk to worker safety). The upper and lower portions of the apparatus are held together by a series of clamps 103. The clamps 103 may also be magnetized such that the apparatus is magnetically attracted to the removal rake 600 (FIG. 6). The mechanisms for assessing the pipeline inside the pipeline assessment device 100 are isolated from the liquid in the pipeline by a series of seals. The seals 104 above the pipeline liquid flow 102 level are rated differently than the seals 107 that would typically be below the pipeline liquid flow 102 level. A series of mechanisms for pipeline assessment can be included in the apparatus. The apparatus could have one or more cameras 105 to capture images of the pipeline defects. The camera(s) 105 would include self-contained lighting systems to illuminate the pipeline 109 during the assessment. The apparatus could also include sample line(s) 106 to assess the headspace above the pipeline liquid flow 102 level in the pipeline 109. These sample line(s) 106 could include sampling of temperature, oxygen levels, concentrations of corrosive gases, and or concentrations of odorous compounds. The apparatus could also include sample line(s) 108 to sample the pipeline liquid flow 102. These mechanisms could include sampling of temperature, pH, or various chemical concentrations within the liquid. The apparatus would be placed in the pipeline and ultimately retrieved from the pipeline access points 110. Unlike traditional CCTV pipeline assessment, the apparatus could travel through multiple pipeline segments before being retrieved from the pipeline. The pipeline assessment device 100 is designed to be disposable. If the pipeline assessment device 100 were to become lodged in a pipeline and nondestructive means (water jetting, etc.) failed to dislodge the pipeline assessment 100 device, a destructive pipeline cleaning tool (root cutter, etc.) could easily break apart the pipeline assessment device 100, clearing any blockage. If the pipeline assessment device 100 were broken apart within the pipeline, components could be recovered both by the removal rake 600 (FIG. 6) and a simple net. A small ring or other similar component 111 is located on the top of the apparatus and is used in conjunction with an angled or other similar component 112 that is attached to a cable or other similar component 113 to launch the apparatus. The apparatus would hang from the angled or other similar component 112 as it is being lowered into the pipeline and the apparatus would be lifted up off of the angled or other similar component 112 when the apparatus begins to float in the pipeline liquid flow 102.

Figure 2:
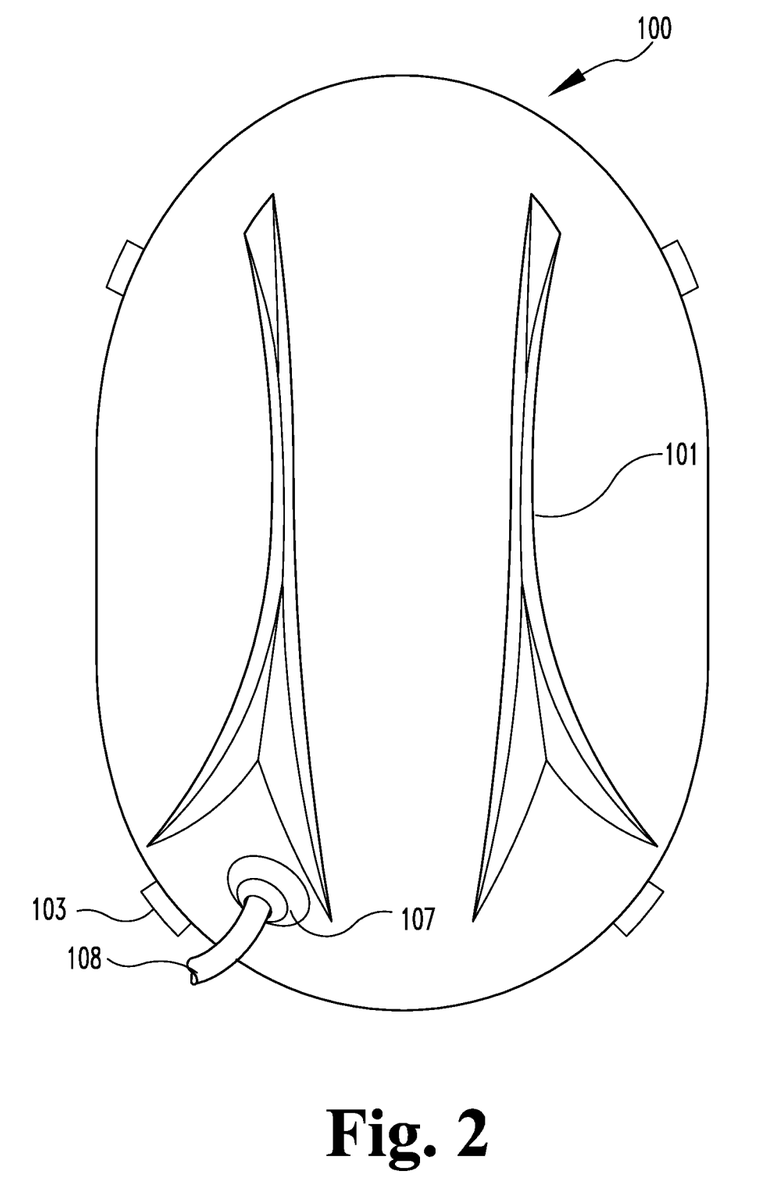
FIG. 2 illustrates a horizontal section view of the exterior base of the lower portion of the apparatus shown in FIG. 1. Illustrated are the guide vanes in greater detail.

FIG. 2 illustrates a horizontal section view of the exterior base of the lower portion of the pipeline assessment device 100. The configuration of guide vanes 101 is one of numerous possible configurations. The guide vanes 101 are designed to keep the apparatus from spinning and/or rotating horizontally as it travels through the pipeline. The guide vanes 101 are designed to minimize resistance when the apparatus is traveling straight down the pipeline and increase resistance as the apparatus begins to rotate. The layout is symmetrical except for one location on the rear of the apparatus that causes the apparatus to perform a 180- degree rotation if the apparatus began moving backwards through the pipeline. The pipeline assessment device 100 may also include one or more sample lines 108 and seals 107 to facilitate assessment of the pipeline liquid flow 102 (FIG. 1). The clamps 103 are also illustrated. The exterior of the pipeline assessment device is constructed of a material that has a low coefficient of friction.

Figure 3:
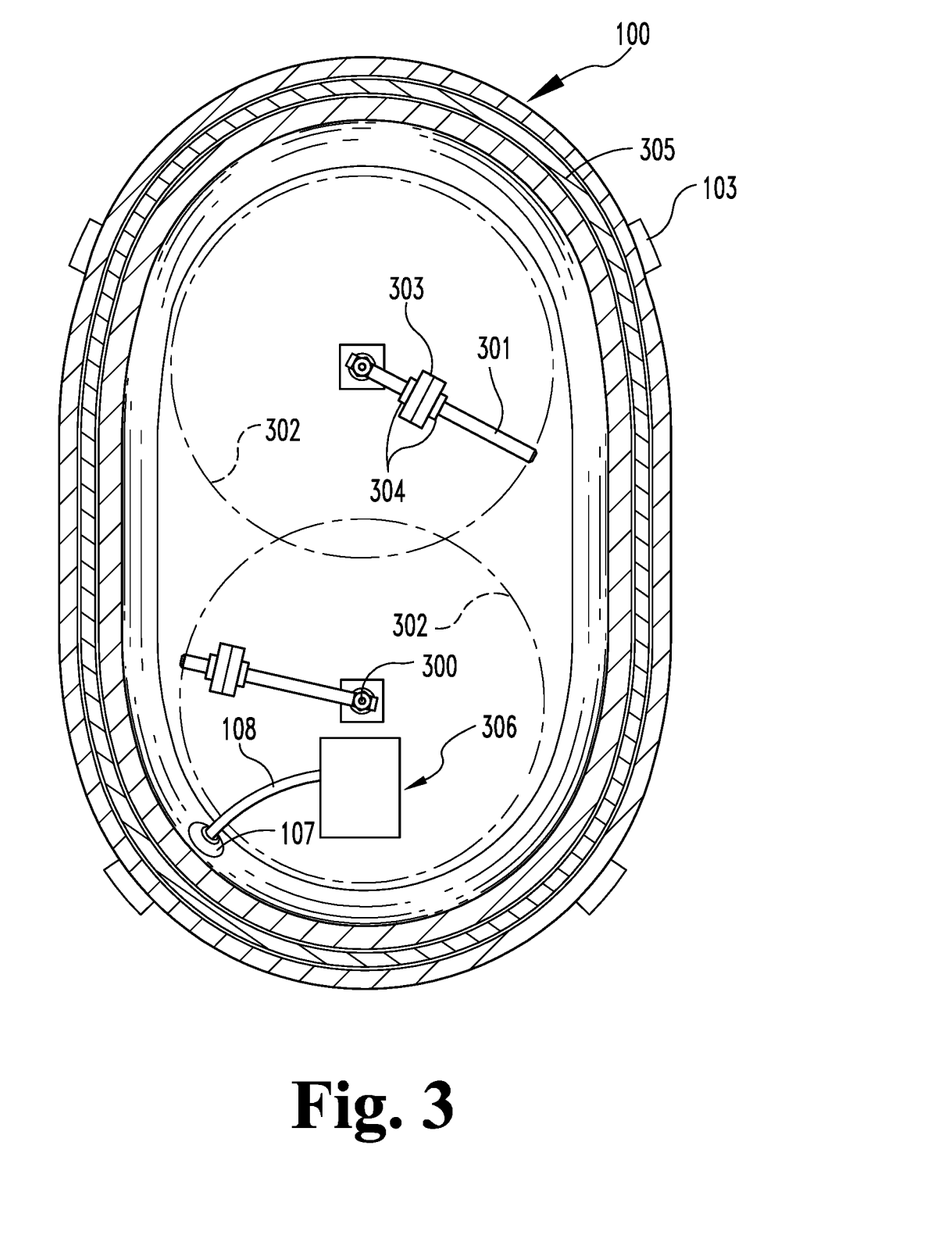
FIG. 3 illustrates a horizontal section view of the interior lower portion of the apparatus shown in FIG. 1. Illustrated is the system of adjustable counter weights, gasket, clamps, and mechanisms to achieve optimal buoyancy and balanced horizontal distribution of weight during the assessment.

FIG. 3 illustrates a horizontal section view of the lower portion of the pipeline assessment device 100. This view illustrates the adjustable system of weights and counterweights to achieve optimal buoyancy and a balanced horizontal distribution of weight. The weight(s) 303 can rotate along a 360-degree path 302 centered around a fixed point 300 that is readily locked and unlocked to allow for easy balancing of the apparatus. The weight(s) 303 slide onto an arm 301 that rotates around the fixed point 300. Multiple weights 303 can be placed on the arm 301 and the position of the weights 303 along the arm 301 is adjustable. Once the desired position is determined, the weight(s) 303 can be held in position by locking rings 304. The primary compressible gasket 305 is illustrated in this view as well as the clamps 103 that join the upper and lower portions of the apparatus. A mechanism of assessment 306 for gathering information on the pipeline liquid flow 102 (FIG. 1) is also shown. This could include temperature, pH, or other industry specific information. The mechanism of assessment 306 accesses the pipeline liquid flow 102 (FIG. 1) via one or more sample lines 108 and use of seals 107.

Figure 4:
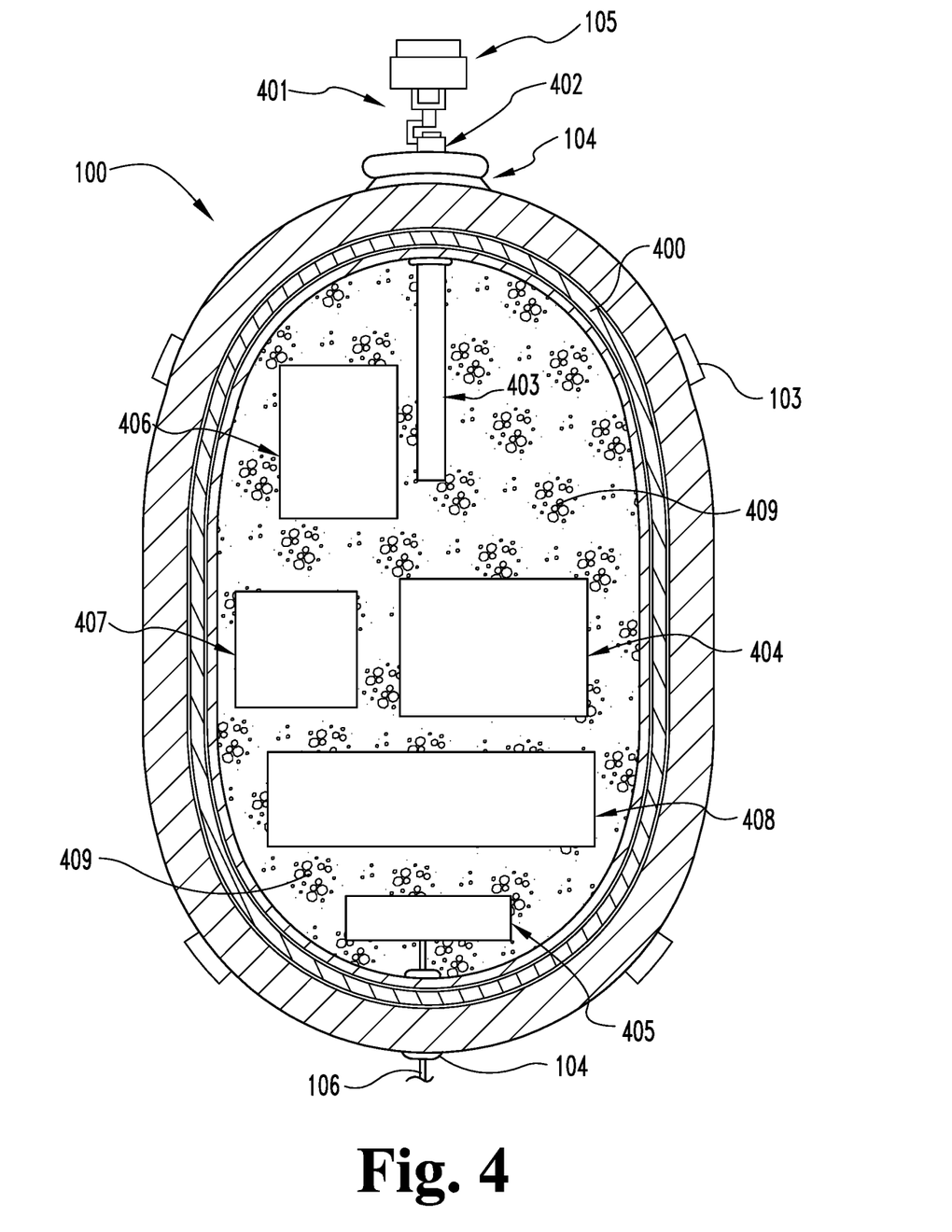
FIG. 4 illustrates a horizontal section view of the interior upper portion of the apparatus shown in FIG. 1. Illustrated are the multiple mechanisms for assessment, gasket, clamps, stabilization mechanisms, data storage and component supporting fill material.

FIG. 4 illustrates a horizontal section view of the interior upper portion of the pipeline assessment device 100. This view illustrates numerous mechanisms for assessment, gasket, clamps, stabilization mechanisms, data storage and component supporting fill material. The secondary compressible gasket 400 is illustrated along with the clamps 103 that create the water tight seal. The seals 104, camera(s) 105, and sample line(s) 106 to assess the headspace above the pipeline liquid flow 102 described under FIG. 1 are illustrated. The gyroscope 401 that allows the camera(s) 105 to remain steady while the apparatus moves through the pipeline 109 (FIG. 1) is illustrated along with the exterior 402 and interior 403 portions of the gyroscope. The upper portion of the apparatus may also contain numerous different mechanisms for pipeline assessment. Components 404, 405, 406, 407 and 408 represent these different mechanisms and could include one or more of the following: battery, data storage, data transmitter, motion dampening gyroscope and/or monitors for temperature, velocity, location, turbulence, pipeline liquid quality, gases in the headspace, camera, laser, etc. The apparatus could include a single mechanism or many different combinations of the mechanisms. The pipeline assessment device 100 could include only one mechanism, but multiple pipeline assessment devices 100 would be used to conduct the assessment, each gathering information via a unique mechanism of assessment. These iterations are more fully discussed in the Claims. The upper portion of the apparatus would also include a custom fill material 409 to keep the various mechanisms in the correct position and prevent damage to the mechanisms as the apparatus moves through the pipeline 109 (FIG. 1).

Figure 5:
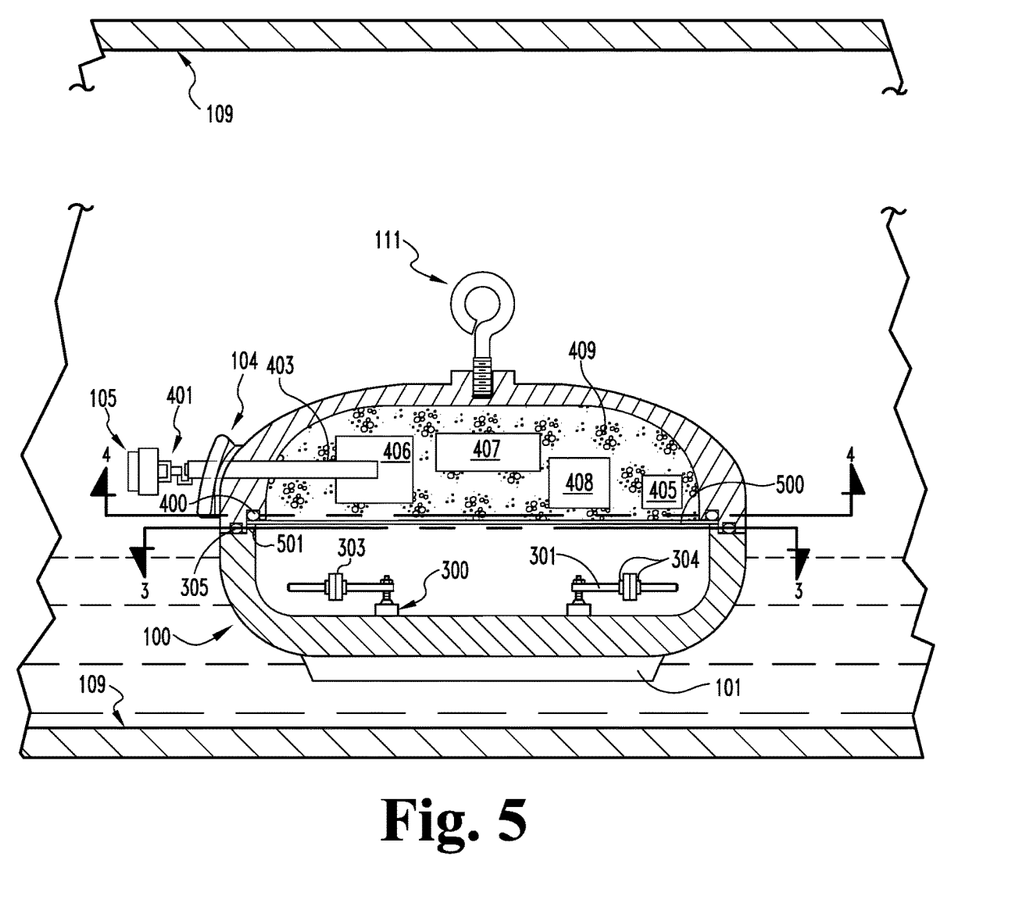
FIG. 5 illustrates a vertical section view of the apparatus shown in FIG. 1. Illustrated are the guide vanes, multiple mechanisms for assessment, gaskets, component supporting custom fill material and the partition separating the upper and lower portions of the apparatus.

FIG. 5 illustrates a vertical section view of the pipeline assessment device 100. This view illustrates the primary compressible gasket 305 and the secondary compressible gasket 400 used to create a watertight seal and the partition 500 that divides the upper and lower portions of the apparatus. The partition 500 provides protection to the more sensitive mechanisms for pipeline assessment 403, 404 (FIG. 4), 405, 406, 407 and 408 that are housed in the upper portion of the apparatus by allowing liquid that gets past the primary compressible gasket 305 to pass through weep holes 501 and accumulate in the lower portion of the apparatus where the liquid would cause less damage to the apparatus. This view provides a section view of the adjustable system of weights and counterweights to achieve optimal buoyancy and a balanced horizontal distribution of weight. The weight(s) 303 slide onto an arm 301 that rotates around the fixed point 300 and are held in position by locking rings 304. The seals 104, camera(s) 105, gyroscope 401, with exterior 402 (FIG. 4) and interior 403 portions of the gyroscope are illustrated along with the custom fill material 409. The pipeline 109, pipeline liquid flow 102 (FIG. 1), small ring or similar component 111, and guide vanes 101 are also illustrated.

FIG. 6 provides a general schematic drawing of the tool used to remove the pipeline assessment device 100 from the pipeline 109 shown in FIG. 1. Illustrated is the removal rake 600 that facilitates retrieval of the pipeline assessment device 100 from deep sewer pipelines while not requiring manned entry into the sewer pipeline. A series of guide rings 602 are attached to a pole 603. The pole 603 could be telescoping or composed of multiple rigid, fixed length poles that are combined to obtain the needed length such that the removal rake 600 length is readily adjustable yet easily transportable. A rake cable 601 passes through the guide rings 602 and attaches to the rotating end point 606 at the lower section of the removal rake 600 and to a rake cable handle 610 at the other end. When the rake cable handle 610 is pulled the rake cable 601 moves through the guide rings 602 and the rotating end point 606 is pulled towards the pole 603 rotating about a central point 604. This greatly compacts the size of the removal rake 600 and is critical as the at grade access points 608 may be significantly smaller than the pipeline 109, the pipeline access points 110 or the pipeline chamber 609. The removal rake 600 needs to be able to sufficiently compact to pass through the at grade access points 608 yet large enough to span the width of the pipeline 109 or the pipeline chamber 609 to collect the pipeline assessment device 100. To facilitate correctly sizing the removal rake 600, the length of the rotating portion of the rake 605 would be adjustable. A number of magnetic rods 607 hang from the rotating portion of the rake 605 and are connected in a manner that allows the magnetic rods 607 to hang vertically regardless of the position of the rotating portion of the rake 605. These magnetic rods 607 collect the pipeline assessment device 100 and their spacing would be proportional to the size of the pipeline assessment device 100 such that the pipeline assessment device 100 could not pass through the removal rake 600 without being collected. The lower sections of the removal rake 600, magnetic rods 607, the rotating portion of the rake 605, the rotating end point 606 and central point 604 could be protected from the pipeline liquid flow 102 via a cover. This cover could be disposable or reusable and could protect workers by limiting exposure to various fluids contained in the pipeline liquid flow 102.

Figure 7:
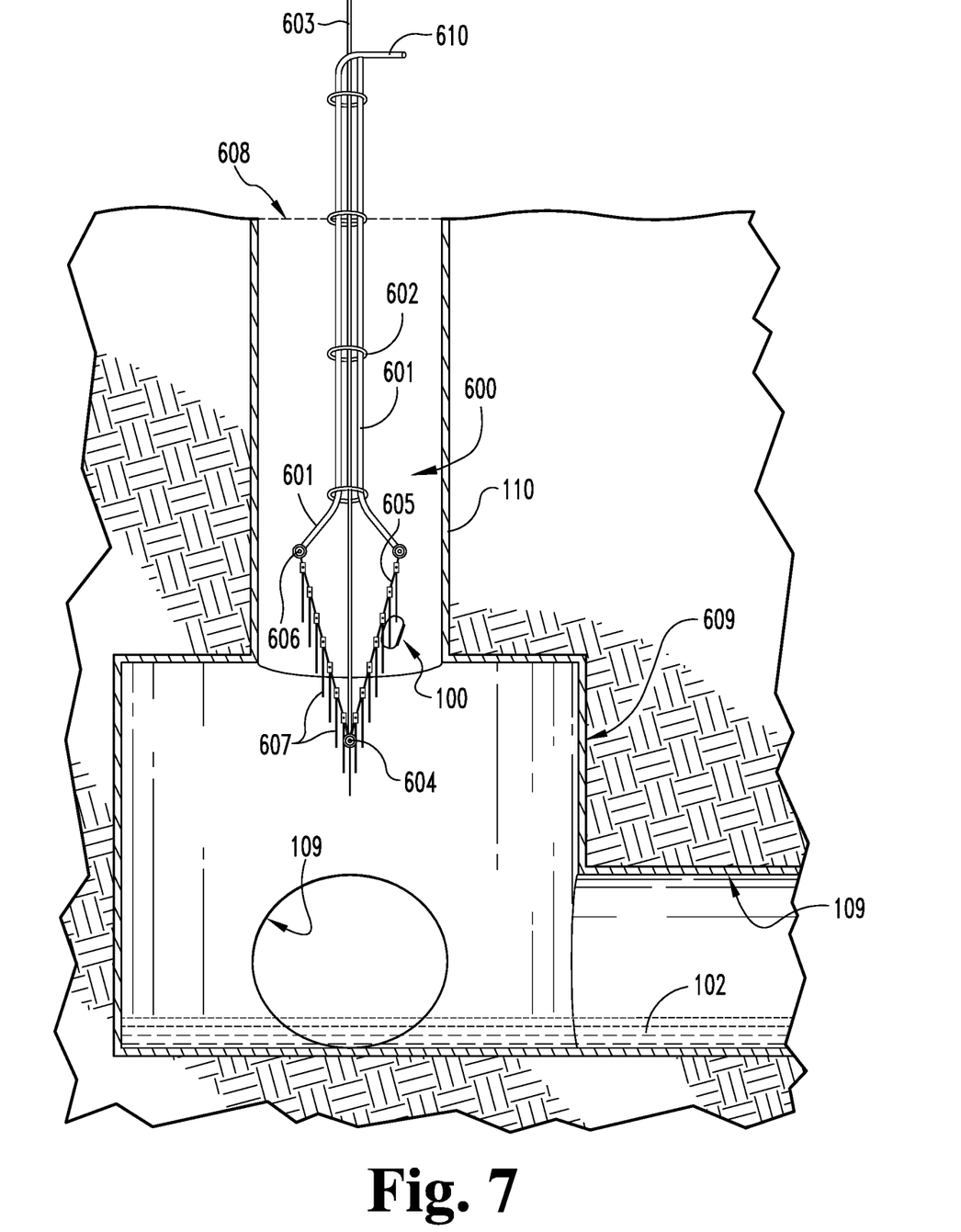
FIG. 7 illustrates a general schematic drawing of the tool used to remove the apparatus shown in FIG. 6. Illustrated is the removal rake after tension has been applied to the rake cable.

FIG. 7 illustrates a general schematic drawing of the tool used to remove the pipeline assessment device 100 from the pipeline 109 shown in FIG. 6. Illustrated is the removal rake 600 after tension has been applied to the rake cable. After the rake cable handle 610 is pulled the rake cable 601 moves through the guide rings 602 and the rotating end point 606 is pulled towards the pole 603 rotating about a central point 604. The rake cable handle 610 would need to be pulled to compress the removal rake 600 to both insert and ultimately retrieve the removal rake 600 passing through the at grade access points 608 and the pipeline access points 110, into the pipeline chamber 609 and the pipeline 109. When the removal rake 600 is in this compact position the magnetic rods 607 hang vertically from the rotating portion of the rake 605. The pipeline assessment device 100 has been collected from the pipeline liquid flow 102 after the completion of a pipeline assessment and is connected to the magnetic rods 607.

Figure 8:
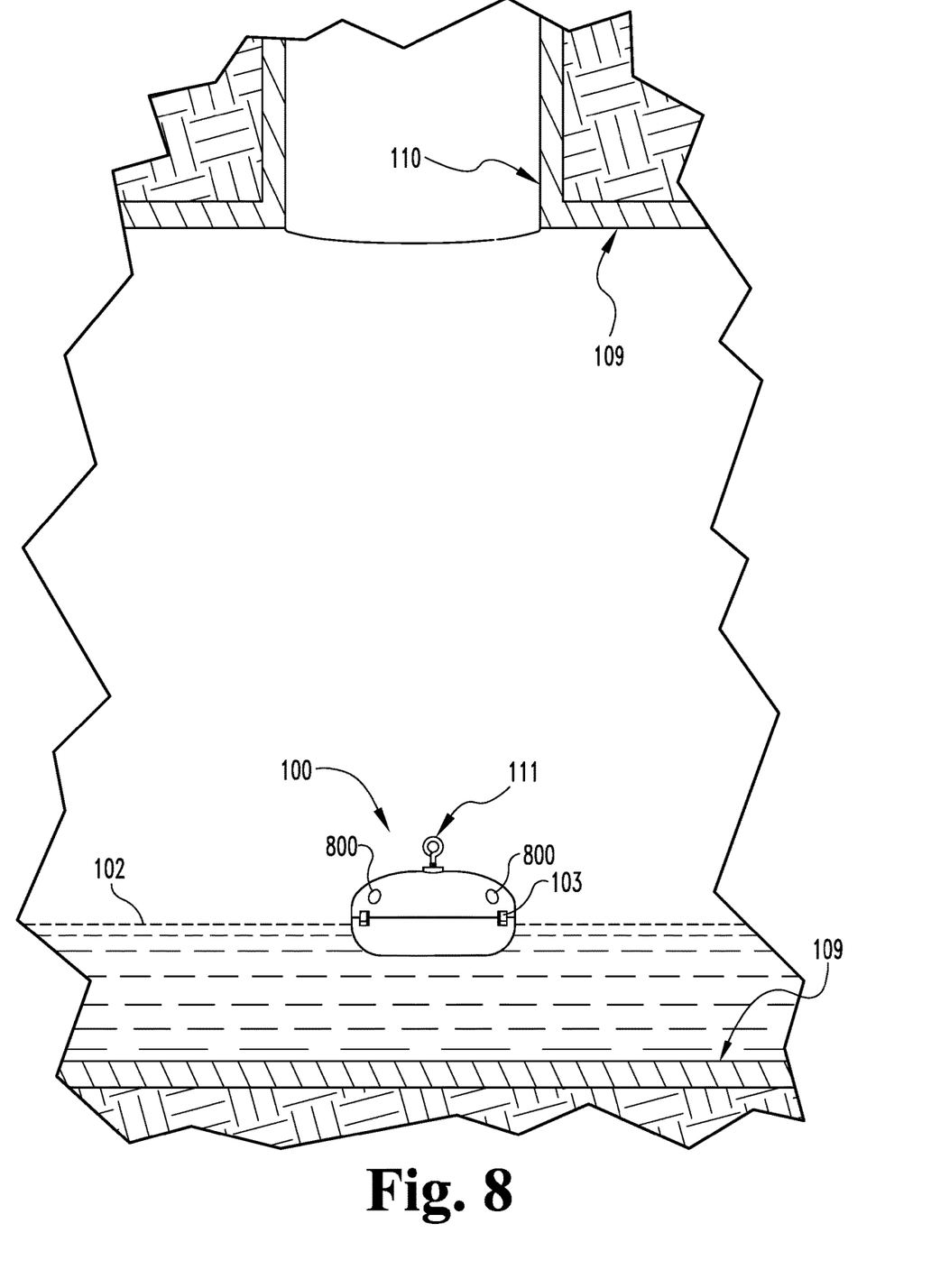
FIG. 8 illustrates an alternative section view of the apparatus shown in FIG. 1. Illustrated is the pipeline assessment device and multiple mechanisms for assessment as would be utilized during a pipeline assessment.

FIG. 8 illustrates an alternative section view of the pipeline assessment device 100. The pipeline liquid flow 102 moves the pipeline assessment device 100 through the pipeline 109 without the need for a tethered connection or human controller facilitates. The clamps 103, pipeline access points 110, and small ring or similar component 111 are also illustrated. The unique aspect of the apparatus shown in FIG. 8 is the lack of guide vanes 101 (FIG. 1 and FIG. 2) or other components 300 (FIG. 3) to control rotation of the apparatus during the assessment. The apparatus would rotate freely within the pipeline 109 and a series of mechanisms 800 would collect information as the apparatus travels through the pipeline 109. These mechanisms could include but are not limited to camera(s) 105 (FIG. 1), laser, etc. The information collected by the series of mechanisms 800 would be processed after the assessment is complete to generate a single video, profile, etc. of the pipeline utilizing commercially available software. Installing only a single mechanism, or limited mechanisms, would allow the size of the pipeline assessment device 100 to be much smaller in total size. The use of multiple pipeline assessment device(s) 100, with each focused on assessing a different aspect of the may be critical to industry acceptance because the decreased size reduces the risk of the pipeline assessment device 100 becoming stuck in the pipeline resulting in a blockage, or other maintenance concern.

While the invention has been illustrated and described in detail in the drawings and foregoing description, the same is to be considered as illustrative and not restrictive in character. Only certain embodiments have been shown and described, and all changes, equivalents, and modifications that come within the spirit of the invention described herein are desired to be protected. The specifics of this description and the attached drawings should not be interpreted to limit the scope of this invention to the specifics thereof. Rather, the scope of this invention should be evaluated with reference to the claims appended hereto.

What is claimed is:

1. A system for inspecting multiple segments of below grade sewer pipeline, comprising:
    a below grade sewer pipeline having an inner diameter and containing a flow of liquid only partially filling the inner diameter so as to define a headspace above the level of the liquid flowing in the sewer pipeline;
    an upstream access point to the sewer pipeline;
    a plurality of downstream access points to the sewer pipeline;
    an untethered floating pipeline assessment device having a size that is substantially smaller than the inner diameter of the sewer pipeline, the assessment device being operable to be lowered into the sewer pipeline at the upstream access point and configured to float and capable of rotation on a surface of the liquid in the pipeline through one or more of the downstream access points and then be retrieved from the sewer pipeline at a selected one of the downstream access points; and a retrieval device operable to be lowered into the sewer pipeline at the selected downstream access point to capture the pipeline assessment device without the need for manned entry into the sewer pipeline.

2. The system of claim 1 in which the retrieval device comprises a plurality of magnets for capturing the assessment device.

3. The system of claim 2 in which the retrieval device further comprises an adjustable length pole.

4. The system of claim 1 in which the retrieval device has an adjustable width such that the retrieval device can have a narrow width when being lowered into the sewer pipeline and a wide width when capturing the pipeline assessment device.

5. The system of claim 1 in which the pipeline assessment device includes at least one camera for capturing images of the sewer pipeline.

6. The system of claim 5 in which the pipeline assessment device includes at least one sensor for measuring a parameter of a gas in the headspace.

7. The system of claim 6 in which the pipeline assessment device includes at least one sensor for measuring a parameter of the liquid in the sewer pipeline.

8. The system of claim 5 in which the pipeline assessment device includes at least one sensor for measuring a parameter of the liquid in the sewer pipeline.

9. The system of claim 1 in which the pipeline assessment device stores assessment data within the device comprises a ring to facilitate lowering of the assessment device into the sewer pipeline.

10. The system of claim 1 in which the pipeline assessment device stores assessment data within the device.

11. A system for inspecting below grade sewer pipeline, comprising:
    a below grade sewer pipeline having an inner diameter and containing a flow of liquid only partially filling the inner diameter so as to define a headspace above the level of the liquid flowing in the sewer pipeline:
    an upstream access point to the sewer pipeline:
    a downstream access point to the sewer pipeline:
    an untethered floating pipeline assessment device having a size that is substantially smaller than the inner diameter of the sewer pipeline, the assessment device being operable to be lowered into the sewer pipeline at the upstream access point and to float in the liquid in the pipeline and then be retrieved from the sewer pipeline at the downstream access point: and
    a retrieval device operable to be lowered into the sewer pipeline at the downstream access point to capture the pipeline assessment device without the need for manned entry into the sewer pipeline, wherein the retrieval device comprises an adjustable width magnetic rake and an adjustable length pole.

12. A method for inspecting multiple segments of a below grade sewer pipeline, comprising:
    providing a below grade sewer pipeline having an inner diameter and containing a flow of liquid only partially filling the inner diameter so as to define a headspace above the level of the liquid flowing in the sewer pipeline;
    lowering an untethered pipeline assessment device into the sewer pipeline from an upstream at grade access point, wherein the pipeline assessment device is configured to float freely on a surface of the liquid and is capable of rotating on the surface of the liquid, and wherein the pipeline assessment device has a size that is substantially smaller than the inner diameter of the sewer pipeline;

allowing the pipeline assessment device to float downstream with the liquid flowing in the sewer pipeline through one or more downstream access points; and lowering a retrieval device into the sewer pipeline from a selected downstream at grade access point to capture the pipeline assessment device without the need for manned entry into the sewer pipeline.

13. The method of claim 12 in which the retrieval device captures the assessment device via magnets.

14. The method of claim 12 in which the retrieval device has an adjustable width, the method further comprising expanding the width of the retrieval device after lowering it into the sewer pipeline.

15. The method of claim 12 further comprising capturing images of the sewer pipeline the pipeline assessment device.

16. The method of claim 12 further comprising sensing at least one parameter of a gas in the headspace with the pipeline assessment device.

17. The method of claim 12 further comprising sensing at least one parameter of the liquid in the sewer pipeline with the pipeline assessment device.

18. The method of claim 17 further comprising sensing at least one parameter of the gas in the headspace with the pipeline assessment device.

19. The method of claim 12 in which the pipeline assessment device is lowered into the sewer pipeline by way of a ring on the pipeline assessment device.

\* \* \* \* \*